(12) United States Patent
Lai (10) Patent No.: US 10,992,770 B2
(45) Date of Patent: Apr. 27, 2021

(54) METHOD AND SYSTEM FOR MANAGING NETWORK SERVICE (71) Applicant: WANGSU SCIENCE & TECHNOLOGY CO., LTD., Shanghai (CN)

(72) Inventor: Zhihui Lai, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 417 days.

(21) Appl. No.: 16/083,140

(22) PCT Filed: Jan. 25, 2018

(86) PCT No.: PCT/CN2018/074148
§ 371 (c)(1),
(2) Date: Sep. 7, 2018

(87) PCT Pub. No.: WO2019/080386
PCT Pub. Date: May 2, 2019

(65) Prior Publication Data
US 2020/0304586 A1    Sep. 24, 2020

(30) Foreign Application Priority Data
Oct. 29, 2017   (CN) .......................... 201711028876.7

(51) Int. Cl.
*G06F 15/173*    (2006.01)
*H04L 29/08*     (2006.01)
(Continued)

(52) U.S. Cl.
CPC ........ *H04L 67/289* (2013.01); *H04L 41/0246* (2013.01); *H04L 41/042* (2013.01);
(Continued)

(58) Field of Classification Search
CPC ............... H04L 67/289; H04L 67/2842; H04L 43/0817; H04L 43/10; H04L 41/0246;
(Continued)

(56) References Cited

U.S. PATENT DOCUMENTS 7,797,409 B1 *  9/2010  Secer ................... H04L 43/0817
                                                        709/223
9,929,916 B1 *  3/2018  Subramanian ........ G06F 3/0484
(Continued)

FOREIGN PATENT DOCUMENTS

CN    101621386 A    1/2010
CN    103685548 A    3/2014
(Continued)

OTHER PUBLICATIONS

The European Patent Office (EPO) The Extended European Search Report for 18870341.7 dated Oct. 29, 2019 9 Pages.
(Continued)

*Primary Examiner* — Richard G Keehn
(74) *Attorney, Agent, or Firm* — Anova Law Group, PLLC (57) ABSTRACT

A method for managing network service includes: when a target server is in a self-controlled "ON" state, detecting, by the target server, an actual on-and-off state of a target network service every preset period of time, and acquiring, by the target server, a standard on-and-off state of the target network service from a control center; if the target network service needs to be turned off based on the standard and actual on-and-off states, sending, by the target server, a service turn-off request of the target network service to the control center; if it is allowed to turn off the target network service, sending, by the control center, a service turn-off notification to the target server, and updating the standard on-and-off state of the target network service of the target
(Continued)

server to an "off" state; and after receiving the service turn-off notification, turning off, by the target server, the target network service.

18 Claims, 3 Drawing Sheets

(51) Int. Cl.
*H04L 12/24* (2006.01)
*H04L 12/26* (2006.01)

(52) U.S. Cl.
CPC ...... *H04L 41/0672* (2013.01); *H04L 41/0686* (2013.01); *H04L 41/0816* (2013.01); *H04L 41/5019* (2013.01); *H04L 43/0817* (2013.01); *H04L 43/10* (2013.01); *H04L 67/2842* (2013.01)

(58) Field of Classification Search
CPC ............... H04L 41/042; H04L 41/0686; H04L 41/0672; H04L 41/5019; H04L 41/0816
See application file for complete search history.

(56) References Cited

U.S. PATENT DOCUMENTS

| | | | | |
|---|---|---|---|---|
| 2003/0105850 | A1* | 6/2003 | Lean | .................... H04L 47/32 |
| | | | | 709/223 |
| 2004/0205074 | A1* | 10/2004 | Berkery | .................... G06F 9/46 |
| 2005/0005169 | A1 | 1/2005 | Kelekar | |
| 2007/0043860 | A1* | 2/2007 | Pabari | .................. G06F 9/5077 |
| | | | | 709/224 |
| 2007/0283002 | A1* | 12/2007 | Bornhoevd | .............. G06F 8/60 |
| | | | | 709/224 |
| 2010/0312899 | A1* | 12/2010 | Herzog | ................... H04L 67/14 |
| | | | | 709/228 |
| 2014/0330783 | A1* | 11/2014 | Provencher | ......... G06F 16/2365 |
| | | | | 707/638 |

FOREIGN PATENT DOCUMENTS

| | | |
|---|---|---|
| CN | 104573117 A | 4/2015 |
| CN | 106060088 A | 10/2016 |
| CN | 107196817 A | 9/2017 |
| WO | 2017113868 A1 | 7/2017 |

OTHER PUBLICATIONS

The China National Intelleectual Property Administration (CNIPA) The China Search Report for 201711028876.7 dated May 31, 2019 13 Pages.

* cited by examiner

FIG. 3

METHOD AND SYSTEM FOR MANAGING NETWORK SERVICE

CROSS-REFERENCES TO RELATED APPLICATIONS

This application is a national phase entry under 35 U.S.C § 371 of International Application No. PCT/CN2018/074148, filed on Jan. 25, 2018, which claims priority of Chinese Patent Application No. 201711028876.7, filed with the State Intellectual Property Office of P. R. China on Oct. 29, 2017, the entire contents of all of which are incorporated herein by reference.

FIELD OF THE DISCLOSURE

The present disclosure relates to the technical field of network communications and, more particularly, relates to a method and a system for managing network services.

BACKGROUND

As the Internet technologies continue to advance, the CDN (Content Delivery Network) service develops rapidly. The network architecture of the CDN includes a large number of network nodes for storing data, and the users may use these network nodes to acquire data stored in the nearest network node within a relatively short period of time.

The aforementioned network nodes include a large number of edge servers. The edge servers are connected to user devices, and are primarily configured to supply data resources to the user devices directly. When malfunctions such as the device load being too high or network connection with the upper-level servers being congested occur, the edge servers often enter an unbound and out-of-control state, and their internal data cannot be updated timely at the upper-level servers. Under this situation, once the control center detects malfunction at a certain edge server, the technicians may manually turn off the network service executed at the edge servers, thus preventing the generation of dirty data when the edge servers continue to provide services.

During the process of implementing the present disclosure, the inventors discover at least following issues in the existing technologies:

it often takes a long period of time from a certain edge server entering the unbound and out-of-control state to the technician turning off the network service executed at the edge server. Thus, the labor cost is relatively high, and as a result, the efficiency of managing the network service is relatively low.

BRIEF SUMMARY OF THE DISCLOSURE

To solve issues in existing technologies, embodiments of the present disclosure provide a method and a system for managing network service. The technical solutions are as follows:

In a first aspect, a method for managing network service is provided, and the method includes:

when a target server is in a self-controlled "ON" state, detecting, by the target server, an actual on-and-off state of a target network service every preset period of time, and acquiring, by the target server, a standard on-and-off state of the target network service from a control center;

if the target server determines that the target network service needs to be turned off based on the standard on-and-off state and the actual on-and-off state, sending, by the target server, a service turn-off request of the target network service to the control center;

if the control center determines that the target server is allowed to turn off the target network service, sending, by the control center, a service turn-off notification to the target server, and updating, by the control center, the standard on-and-off state of the target network service of the target server to an "off" state; and after receiving the service turn-off notification, turning off, by the target server, the target network service.

Optionally, the method further includes:

sending, by the target server, a self-controlled "ON" request to the control center periodically;

if the control center determines that a preset self-controlled state of the target server is an "on" state, sending, by the control center, a self-controlled "ON" notification to the target server; and after receiving the self-controlled "ON" notification, entering, by the target server, the self-controlled "ON" state.

Optionally, if the target server determines that the target network service needs to be turned off based on the standard on-and-off state and the actual on-and-off state, sending, by the target server, a service turn-off request of the target network service to the control center, includes:

if the standard on-and-off state and the actual on-and-off state are both "on" states, acquiring, by the target server, a preset on-and-off state of the target network service of the target server from the control center; and if the preset on-and-off state is an "off" state, determining, by the target server, that the target network service needs to be turned off, and sending, by the target server, the service turn-off request of the target network service to the control center.

Optionally, if the target server determines that the target network service needs to be turned off based on the standard on-and-off state and the actual on-and-off state, sending, by the target server, a service turn-off request of the target network service to the control center, includes:

if the standard on-and-off state is an "on" state and the actual on-and-off state is an "off" state, determining, by the target server, that the target network service needs to be turned off, and sending, by the target server, the service turn-off request of the target network service to the control center.

Optionally, if the target server determines that the target network service needs to be turned off based on the standard on-and-off state and the actual on-and-off state, sending, by the target server, a service turn-off request of the target network service to the control center, includes:

if the standard on-and-off state is an "off" state and the actual on-and-off state is an "on" state, sending out, by the target server, a state-error alarm, and/or sending, by the target server, a state-error notification to the control center.

Optionally, if the control center determines that the target server is allowed to turn off the target network service, sending, by the control center, a service turn-off notification to the target server, and updating, by the control center, the standard on-and-off state of the target network service of the target server to an "off" state, includes:

if a turn-off ratio of target network services of all servers is smaller than a preset ratio threshold and a received number of service turn-off requests of the target network service sent by the target server is greater than a preset number threshold after the target network service of the target server is turned off, allowing, by the control center, the target server to turn off the target network service, sending, by the control center, the service turn-off notification to the target server, and updating, by the control center, the standard on-and-off state of the target network service of the target server to the "off" state.

Optionally, under situations where there are multiple control centers, after one of the control centers updates the standard on-and-off state, the other control centers are notified to carry out synchronous update.

Optionally, under situations where there are multiple control centers, after one of the control centers receives the service turn-off request and before the control center increases a count value of requests, other control centers are notified in advance to synchronously increase a count value of requests with the control center.

Optionally, the target server is an edge server of the CDN system, and the edge server is installed with an agent timer service. The control center is installed with a network management platform and an http interface service, and the edge server performs loop communication with the control center though the http interface service.

In a second aspect, a system for managing network service is provided, and the system includes a target server and a control center.

The target server is configured for, when in a self-controlled "ON" state, detecting an actual on-and-off state of a target network service every preset period of time and acquiring a standard on-and-off state of the target network service from a control center.

The target server is further configured for, if it is determined that that the target network service needs to be turned off based on the standard on-and-off state and the actual on-and-off state, sending a service turn-off request of the target network service to the control center.

The control center is configured for, if it is determined that the target server is allowed to turn off the target network service, sending a service turn-off notification to the target server, and updating, by the control center, the standard on-and-off state of the target network service of the target server to an "off" state.

The target server is further configured for, after receiving the service turn-off notification, turning off the target network service.

Optionally, the target server is further configured for sending a self-controlled "ON" request to the control center periodically;

the control center is further configured for, if it is determined that a preset self-controlled state of the target server is an "on" state, sending a self-controlled "ON" notification to the target server; and the target server is further configured for, after receiving the self-controlled "ON" notification, entering the self-controlled "ON" state.

Optionally, the target server is configured for:

if the standard on-and-off state and the actual on-and-off state are both "on" states, acquiring a preset on-and-off state of the target network service of the target server from the control center; and if the preset on-and-off state is an "off" state, determining that the target network service needs to be turned off, and sending the service turn-off request of the target network service to the control center.

Optionally, the target server is configured for:

if the standard on-and-off state is an "on" state and the actual on-and-off state is an "off" state, determining that the target network service needs to be turned off, and sending the service turn-off request of the target network service to the control center.

Optionally, the target server is configured for:

if the standard on-and-off state is an "off" state and the actual on-and-off state is an "on" state, sending out a state-error alarm and/or sending a state-error notification to the control center.

Optionally, the control center is configured for:

if a turn-off ratio of the target network service of all servers is smaller than a preset ratio threshold and the received number of service turn-off requests of the target network service sent by the target server is greater than a preset number threshold after the target network service of the target server is turned off, allowing the target server to turn off the target network service, and sending the service turn-off notification to the target server, and further, updating the standard on-and-off state of the target network service of the target server to the "off" state.

Optionally, there are multiple control centers, and after one of the control centers updates the standard on-and-off state, the other control centers are notified to carry out synchronous update.

Optionally, there are multiple control centers, and after one of the control centers receives the service turn-off request and before the control center increases a count value of requests, other control centers are notified in advance to synchronously increase a count value of requests with the control center.

Optionally, the target server is an edge server of the CDN system, and the edge server is installed with an agent timer service. The control center is installed with a network management platform and an http interface service, and the edge server performs loop communication with the control center though the http interface service.

Beneficial effects brought about by technical solutions provided by embodiments of the present disclosure include:

in embodiments of the present disclosure, when in a self-controlled "ON" state, the target server detects the actual on-and-off state of the target network service executed locally every preset period of time, and acquires the standard on-and-off state of the target network service from the control center. If the target server determines that the target network service needs to be turned off based on the standard on-and-off state and the actual on-and-off state, the target server sends the service turn-off request of the target network service to the control center. If the control center determines that it is allowed for the target server to turn off the target network service, the control center sends the service turn-off notification to the target server, and updates the standard on-and-off state of the target network service of the target server to the "off" state. After receiving the service turn-off notification, the target server turns off the target network service. As such, when a certain server enters an unbound and out-of-control state, the on-and-off state of the network service executed thereon can be timely acquired from the control center, thereby automatically turning off the network service. Accordingly, the efficiency of managing the network service may be improved.

BRIEF DESCRIPTION OF THE DRAWINGS

To more clearly illustrate technical solutions of the present disclosure, accompanying drawings used in descriptions of embodiments hereinbelow are introduced briefly. Obviously, the accompanying drawings described hereinafter are only some embodiments of the present disclosure, and for those ordinarily skilled in the relevant art, other drawings may be obtained from these accompanying drawings without creative labor.

DETAILED DESCRIPTION

To make the objective, technical solutions and advantages of the present disclosure clearer, embodiments of the present disclosure are described in more details with reference to the accompanying drawings.

Figure 1:
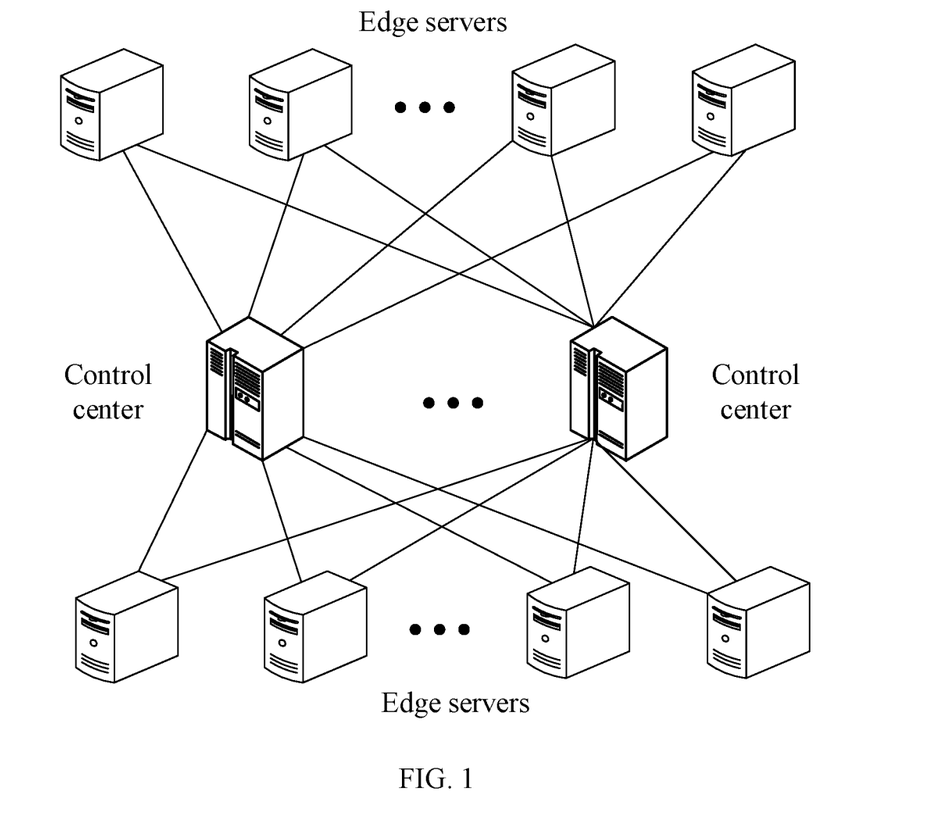
FIG. 1 illustrates a schematic view of a network for managing network service according to embodiments of the present disclosure.
Figure 3:
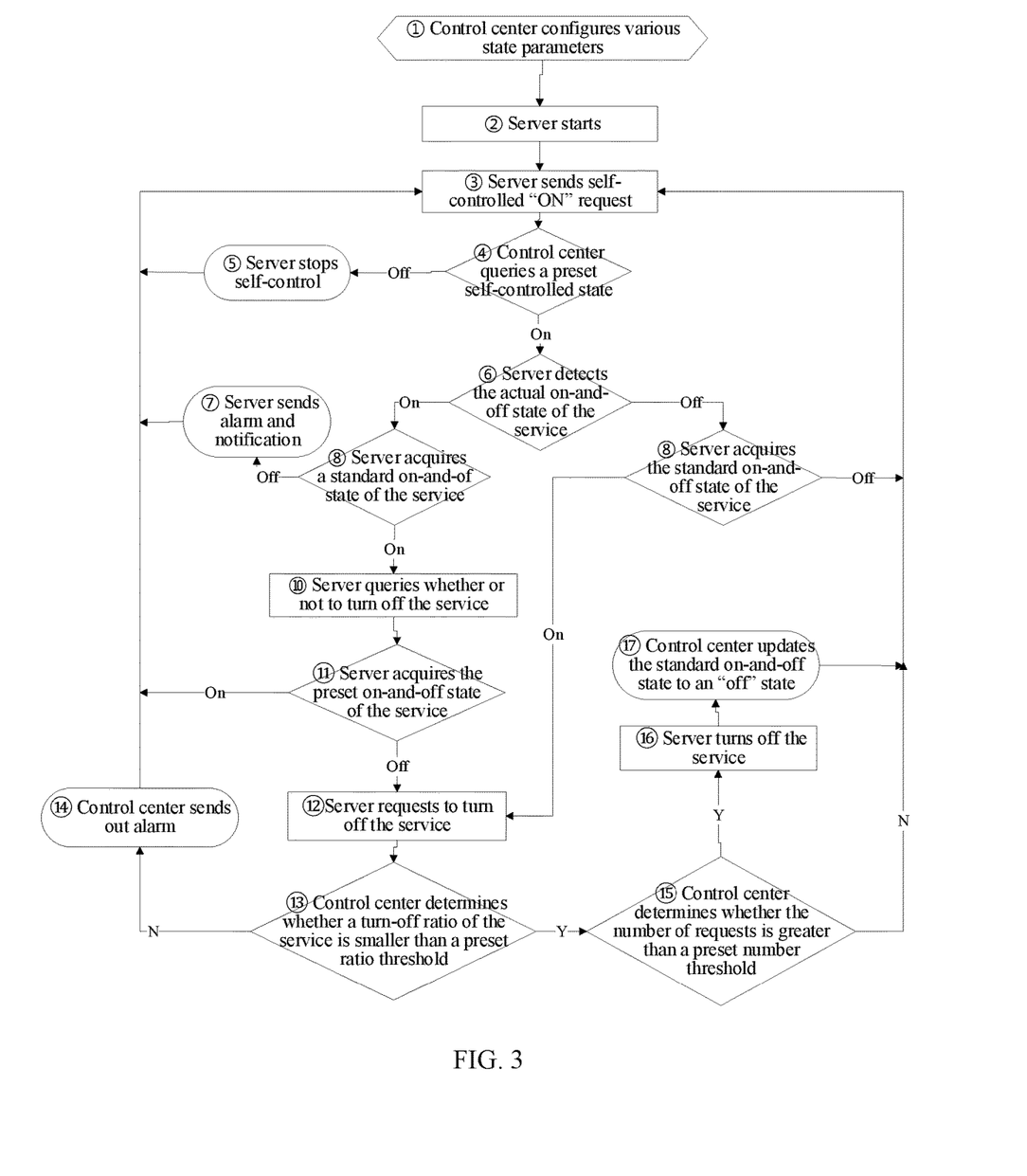
FIG. 3 illustrates an overall schematic flow chart for managing network service according to embodiments of the present disclosure.

Embodiments of the present disclosure provide a method for managing network service, and the method may be implemented by a server and a control center. The server may be an edge server of a CDN system, and the CDN system may include a plurality of edge servers. The plurality of edge servers may be managed by one or more control centers, and their network frame is illustrated in FIG. 1. In one embodiment, under situations where there are multiple control centers, each edge server by default communicates with a corresponding master control center, and special conditions will be illustrated below. An edge server may be installed with an agent timer service, and the control center may be installed with a network management platform and an http (Hyper Text Transfer Protocol) interface service. The edge server may perform loop communication with the control center through the http interface service. The control center may manage the network services executed by the edge server through manual state configuration and threshold management, as shown in Step 1 of FIG. 3. The server may include a processor, a memory, and a transceiver. The processor may be configured for processing of network service management in the processes described hereinafter. The memory may be configured for storing data needed and generated in the processes described hereinafter. The transceiver may be configured for receiving and sending the related data in the processes described hereinafter, for example, the transceiver may be configured for acquiring an on-and-off state and sending a request, etc. In one embodiment, the edge servers may be generally referred to as servers, the target edge servers may be generally referred to as target servers, and ambiguous descriptions will be illustrated in detail.

Figure 2:
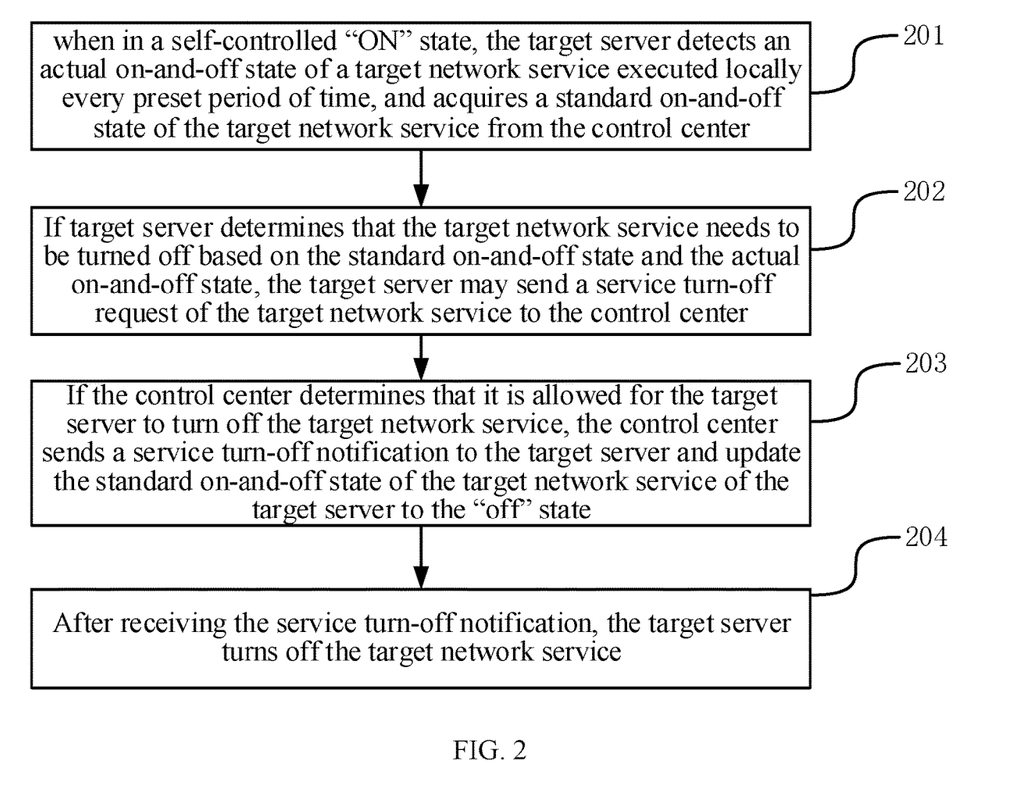
FIG. 2 illustrates a flow chart of a method for managing network service according to embodiments of the present disclosure.

With reference to specific embodiments hereinafter, detailed illustrations regarding a processing flow chart of managing network service in FIG. 2 are provided below, and the process may include:

Step 201, when in a self-controlled "ON" state, the target server detects an actual on-and-off state of a target network service executed locally every preset period of time, and acquires a standard on-and-off state of the target network service from the control center.

The standard on-and-off state may be an execution state of the network service of the server latest recorded at the control center. The initial value of the standard on-and-off state may be defined by a technician at the control center, and may be automatically changed later by the control center or may be modified by the technician manually.

In implementation, a server may include two management approaches: self-control and manual control. In the self-controlled "ON" state, the server may perform communication with the control center based on a preset processing logic, thus realizing management on the network services executed locally. In the manual control state, the server may rely on operations of the technician to realize management of the network services. When in the self-controlled "ON" state, a target server may periodically detect the operation state of the network service executed locally. That is, the actual on-and-off state of each network service may be acquired every preset period of time. Further, the target server may send a query request of the standard on-and-off state of the target network service to the control center, and the control center may feedback the aforementioned standard on-and-off state to the target server. Here, one server may execute one or more network services. The present disclosure provides examples in which one server maintains one network service for illustrative purposes, and situations where there are multiple network services are similar thereto, which are only illustrated when necessary.

At step 202, if the target server determines that the target network service needs to be turned off based on the standard on-and-off state and the actual on-and-off state, the target server may send a service turn-off request of the target network service to the control center.

In implementation, after acquiring the standard on-and-off state and the actual on-and-off state of the target network service, the target server may determine whether or not the target network service executed locally needs to be turned off based on the aforementioned two on-and-off states. If it is determined that the target network service needs to be turned off, the target server may send the service turn-off request of the target network service to the control center. More specifically, the service turn-off request may carry an identity of the target server and an identity of the target network service. If it is determined that the target network service does not need to be turned off, corresponding processes may be performed based on different standard on-and-off states and actual on-and-off states, and specific illustrations will be provided hereinafter.

Optionally, for different standard on-and-off states and actual on-and-off states, there are different processing situations. Specific descriptions are as follows.

In situation 1, if the standard on-and-off state and the actual on-and-off state are both "on" states, the target server acquires a preset on-and-off state of the target network service of the target server from the control center. If the preset on-and-off state is an "off" state, it is determined that the target network service needs to be turned off, and a service turn-off request of the target network service is sent to the control center.

The preset on-and-off state may be an initial on-and-off state of each network service at each server pre-configured at the control center by the technician performing planning on the network services of all servers, and the technician may change the preset on-and-off state at any time based on the operation states of the servers.

In implementation, for the target network service, if the acquired standard on-and-off state and the detected actual on-and-off state are both the "on" states, the target server may send a query request of a preset on-and-off state of the target network service to the control center. After receiving the query request, the control center may look up the preset on-and-off state of the target network service of the target server recorded locally, and feedback the preset on-and-off state to the target server. As such, the target server may acquire the preset on-and-off state of the target network service. If the preset on-and-off state is an "off" state, it is determined that the target network service needs to be turned off. Thus, the target server may send the service turn-off request of the target network service to the control center. The aforementioned process may refer to the processing process of step 6-8-10-11-12 in FIG. 3. If the preset on-and-off state is an "on" state, it is determined that the target network service no longer needs to be turned off, and the target server needs no processing within the current period, as seen in the processing process of step 6-8-10-11-3 in FIG. 3.

In situation 2, if the standard on-and-off state is the "on" state and the actual on-and-off state is the "off" state, the target server determines that the target network service needs to be turned off and sends the service turn-off request of the target network service to the control center.

In implementation, for the target network service, if the acquired standard on-and-off state is the "on" state and the detected actual on-and-off state is the "off" state, it is indicated that the target network service enters from the "on" state to the "off" state within the previous period. Under this case, the target server may determine that the target network service needs to be turned off, and may further send the service turn-off request of the target network service to the control center. Accordingly, the control center may timely update the standard on-and-off state of the target network service at the target server. The aforementioned process may refer to the processing process of step 6-8-12 in FIG. 3.

In situation 3, if the standard on-and-off state is the "off" state and the actual on-and-off state is the "on" state, the target server sends out a state-error alarm or sends a state-error notification to the control center.

In implementation, for the target network service, if the acquired standard on-and-off state is the "off" state and the detected actual on-and-off state is the "on" state, it is indicated that the target network service enters from the "off" state to the "on" state automatically within the previous period, or a technician changes the standard on-and-off state of the target network service from the "on" state to the "off" state within the previous period. In this case, the target server may send out a state-error alarm to notify the technician at the target server side to perform manual management. Further, the target server may send a state-error notification to the control center. The aforementioned process may refer to the processing process of step 6-8-7 in FIG. 3. It is not hard to assume that after receiving the state-error notification, the control center may also send out a state-error alarm, thereby notifying the technician at the control center side to perform manual management.

In situation 4, if the standard on-and-off state and the actual on-and-off state are both the "off" states, the target server may maintain a current operation state of the target network service.

In implementation, for the target network service, if the acquired standard on-and-off state and the detected actual on-and-off state are both the "off" states, the target server may perform no change to the operation state of the target network service but wait for the next period to restart the processing process of managing the network service. The aforementioned process may refer to the processing process of step 6-8-3 in FIG. 3.

At step 203, if the control center determines that it is allowed for the target server to turn off the target network service, the control center sends a service turn-off notification to the target server and update the standard on-and-off state of the target network service of the target server to the "off" state.

In implementation, after the control center receives the service turn-off request of the target network service sent by the target server, the control center may determine whether the target server is allowed to turn off the target network service based on the standard on-and-off state of the target network service of each server. If the control center determines that the target server is allowed to turn off the target network service, the control center may send the service turn-off notification that carries an identity of the target network service to the target server. Further, the locally recorded standard on-and-off state of the target network service of the target server may be updated to the "off" state.

Optionally, whether the target server is allowed to turn off the target network service may be determined based on the consideration that whether the network service of the whole system will collapse. Correspondingly, the processing of step 203 may include followings: if a turn-off ratio of target network services of all servers is smaller than a preset ratio threshold and a received number of service turn-off requests of the target network service sent by the target server is greater than a preset number threshold after the target network service of the target server is turned off, the control center allows the target server to turn off the target network service. Further, the control center sends the service turn-off notification to the target server, and updates the standard on-and-off state of the target network service of the target server to the "off" state. It is worth mentioning that, under situations where there are multiple control centers, after one control center updates the aforementioned standard on-and-off state, other control centers need to be notified to perform synchronous update.

In implementation, after the control center receives the service turn-off request of the target network service sent by the target server, the control center may first identify the standard on-and-off state of the target network service for each server. If the turn-off ratio of the target network services of all servers is smaller than the preset ratio threshold after the target network service of the target server is turned off, it can be determined that turning off the target network service of the target server will not result in global service collapse. Further, the control center may configure a request counter for each network service of each server. After a service turn-off request of the target network service sent by the target server is received, the corresponding count value of requests may be increased by 1. When the number of received service turn-off requests is greater than the preset number threshold, the control center may allow the target server to turn off the target network service, which effectively prevents occurrence of the situation of global service collapse caused by emergence of a large number of service turn-off request within the same period. Further, the control center may send the service turn-off notification to the target server, and update the standard on-and-off state of the target network service of the target server to the "off" state. The aforementioned process may refer to the processing process step 12-13-15-16-17 in FIG. 3. It is worth mentioning that, under situations where there are multiple control centers, if one control center receives the service turn-off request, before the count value of the requests is increased, the other control centers may be notified in advance to increase the count value of the requests synchronously with the one control center. Accordingly, inaccuracy of the count value of the requests caused by the target server submitting the service turn-off request to different control centers may be avoided.

At step 204, after receiving the service turn-off notification, the target server turns off the target network service.

In implementation, the target server may receive the service turn-off notification sent by the control center and acquire an identity of the target network service carried therein. Further, the target server may turn off the target network service to realize self-controlled management of the target network service.

Optionally, the control center may determine whether a server performs self-controlled management or manual management, and the corresponding process may be as follows: the target server may periodically send a self-controlled "ON" request to the control center; if the control center determines that the preset self-controlled state of the target serer is an "on" state, the control center sends a self-controlled "ON" notification to the target server; after receiving the self-controlled "ON" notification, the target server enters the self-controlled "ON" state.

In implementation, the technician may, at the control center, configure whether all servers can turn on the self-controlled state, i.e., record a preset self-controlled state of each server, and change the aforementioned preset self-controlled state at any time based on the operation state of the server. Further, a global management switch whose priority is higher than any server may be configured at the control center. Accordingly, when necessary, the self-controlled process of all servers may be timely stopped to prevent a large number of servers from losing control.

After the target server enters an operation state, the target server may send a self-controlled "ON" request periodically to the control center, thus querying whether self-controlled management is performed in follow-up periods. After receiving the self-controlled "ON" request sent by the target server, the control center may acquire the locally recorded preset self-controlled state of the target server. If the preset self-controlled state is the "on" state, the control center may send the self-controlled "ON" notification to the target server. After receiving the self-controlled "ON" notification, the target server may enter the self-controlled "ON" state. The aforementioned process may refer to the processing process of step 2-3-4-6 in FIG. 3. Obviously, if the preset self-controlled state of the target server is the "off" state, the control center may send a self-controlled "OFF" notification to the target server. After receiving the self-controlled "OFF" notification, the target server may give up self-controlled management within the current period and, upon the beginning of the next period, re-sends the self-controlled "ON" request. Such process may refer to the processing process of step 2-3-4-3 in FIG. 3. It needs to be noted that, the period of the target server to detect the actual on-and-off state in step 201 may be the same period with respect to the period of the target server to send the self-controlled "ON" request. That is, each time the target server receives the self-controlled "ON" notification and enters the self-controlled "ON" state, the target server may start to process the state detection of the target network service. It is worth mentioning that, under a situation where there are multiple control centers, the target server may parse the locally recorded domain names of all control centers to acquire the IP (Internet Protocol) addresses of all control centers. Further, the target server may send the self-controlled "ON" request to all control centers. When at least one control center responds and returns the self-controlled "ON" notification and no control center returns the self-controlled "OFF" notification, the target server may enter the self-controlled "ON" state. Thus, global error operation caused by out-of-control of partial control centers may be avoided.

In embodiments of the present disclosure, when in a self-controlled "ON" state, the target server detects the actual on-and-off state of the target network service executed locally every preset period of time, and acquires the standard on-and-off state of the target network service from the control center. If the target server determines that the target network service needs to be turned off based on the standard on-and-off state and the actual on-and-off state, the target server sends the service turn-off request of the target network service to the control center. If the control center determines that it is allowed for the target server to turn off the target network service, the control center sends the service turn-off notification to the target server, and updates the standard on-and-off state of the target network service of the target server to the "off" state. After receiving the service turn-off notification, the target server turns off the target network service. As such, when a certain server enters an unbound and out-of-control state, the on-and-off state of the network service executed thereon can be timely acquired from the control center, thereby automatically turning off the service. Accordingly, the efficiency of managing the network service may be improved.

Based on the same technical concept, embodiments of the present disclosure provide a system for managing network service, and the system includes a target server and a control center.

The target server is configured for, when in a self-controlled "ON" state, detecting an actual on-and-off state of a target network service every preset period of time and acquiring a standard on-and-off state of the target network service from a control center.

The target server is further configured for, if it is determined that the target network service needs to be turned off based on the standard on-and-off state and the actual on-and-off state, sending a service turn-off request of the target network service to the control center.

The control center is configured for, if it is determined that the target server is allowed to turn off the target network service, sending a service turn-off notification to the target server, and updating, by the control center, the standard on-and-off state of the target network service of the target server to an "off" state.

The target server is further configured for, after receiving the service turn-off notification, turning off the target network service.

Optionally, the target server is further configured for sending a self-controlled "ON" request to the control center periodically;

the control center is further configured for, if it is determined that a preset self-controlled state of the target server is an "on" state, sending a self-controlled "ON" notification to the target server; and the target server is further configured for, after receiving the self-controlled "ON" notification, entering the self-controlled "ON" state.

Optionally, the target server is configured for:

if the standard on-and-off state and the actual on-and-off state are both "on" states, acquiring a preset on-and-off state of the target network service of the target server from the control center; and if the preset on-and-off state is an "off" state, determining that the target network service needs to be turned off, and sending the service turn-off request of the target network service to the control center.

Optionally, the target server is configured for:

if the standard on-and-off state is an "off" state and the actual on-and-off state is an "on" state, sending out a state-error alarm and/or sending a state-error notification to the control center.

Optionally, the target server is configured for:

if the standard on-and-off state is an "on" state and the actual on-and-off state is an "off" state, determining that the target network service needs to be turned off, and sending the service turn-off request of the target network service to the control center.

Optionally, the target server is configured for:

if the standard on-and-off state is an "on" state and the actual on-and-off state is an "off" state, determining that the target network service needs to be turned off, and sending the service turn-off request of the target network service to the control center.

Optionally, the control center is configured for:

if a turn-off ratio of the target network service of all servers is smaller than a preset ratio threshold and the received number of service turn-off requests of the target network service sent by the target server is greater than a preset number threshold after the target network service of the target server is turned off, allowing the target server to turn off the target network service, and sending the service turn-off notification to the target server, and further, updating the standard on-and-off state of the target network service of the target server to the "off" state.

Optionally, there are multiple control centers, and after one of the control centers updates the standard on-and-off state, the other control centers are notified to carry out synchronous update.

Optionally, there are multiple control centers, and after one of the control centers receives a service turn-off request and before the control center increases a count value of requests, other control centers are notified in advance to increase a count value of requests synchronously with the control center.

Optionally, the target server is an edge server of the CDN system, and the edge server is installed with an agent timer service. The control center is installed with a network management platform and an http interface service, and the edge server performs loop communication with the control center though the http interface service.

In embodiments of the present disclosure, when in a self-controlled "ON" state, the target server detects the actual on-and-off state of the target network service executed locally every preset period of time, and acquires the standard on-and-off state of the target network service from the control center. If the target server determines that the target network service needs to be turned off based on the standard on-and-off state and the actual on-and-off state, the target server sends the service turn-off request of the target network service to the control center. If the control center determines that it is allowed for the target server to turn off the target network service, the control center sends the service turn-off notification to the target server, and updates the standard on-and-off state of the target network service of the target server to the "off" state. After receiving the service turn-off notification, the target server turns off the target network service. As such, when a certain server enters an unbound and out-of-control state, the on-and-off state of the network service executed thereon can be timely acquired from the control center, thereby automatically turning off the service. Accordingly, the efficiency of managing the network service may be improved.

Those ordinarily skilled in the relevant art may understand that all or partial steps of the aforementioned embodiments may be implemented through hardware, or may be completed by using programs to instruct the related hardware. All the aforementioned programs may be stored in the computer-readable storage medium. The aforementioned storage medium may be read-only memory, magnetic disc or optical disc.

The foregoing are merely certain preferred embodiments of the present disclosure, and are not intended to limit the present disclosure. Without departing from the spirit and principles of the present disclosure, any modifications, equivalent substitutions, and improvements, etc. shall fall within the scope of the present disclosure.

What is claimed is:

1. A method for managing network service, comprising:
   when a target server is in a self-controlled "ON" state, detecting, by the target server, an actual on-and-off state of a target network service every preset period of time, and acquiring, by the target server, a standard on-and-off state of the target network service from a control center;
   if the target server determines that the target network service needs to be turned off based on the standard on-and-off state and the actual on-and-off state, sending, by the target server, a service turn-off request of the target network service to the control center;
   if the control center determines that the target server is allowed to turn off the target network service, sending, by the control center, a service turn-off notification to the target server, and updating, by the control center, the standard on-and-off state of the target network service of the target server to an "off" state; and
   after receiving the service turn-off notification, turning off, by the target server, the target network service.

2. The method according to claim 1, further comprising:
   sending, by the target server, a self-controlled "ON" request to the control center periodically;
   if the control center determines that a preset self-controlled state of the target server is an "on" state, sending, by the control center, a self-controlled "ON" notification to the target server; and
   after receiving the self-controlled "ON" notification, entering, by the target server, the self-controlled "ON" state.

3. The method according to claim 1, wherein if the target server determines that the target network service needs to be turned off based on the standard on-and-off state and the actual on-and-off state, sending, by the target server, a service turn-off request of the target network service to the control center, includes:
   if the standard on-and-off state and the actual on-and-off state are both "on" states, acquiring, by the target server, a preset on-and-off state of the target network service of the target server from the control center; and
   if the preset on-and-off state is an "off" state, determining, by the target server, that the target network service needs to be turned off, and sending, by the target server, the service turn-off request of the target network service to the control center.

4. The method according to claim 1, wherein if the target server determines that the target network service needs to be turned off based on the standard on-and-off state and the actual on-and-off state, sending, by the target server, a service turn-off request of the target network service to the control center, includes:
   if the standard on-and-off state is an "on" state and the actual on-and-off state is an "off" state, determining, by the target server, that the target network service needs to be turned off, and sending, by the target server, the service turn-off request of the target network service to the control center.

5. The method according to claim 1, wherein if the target server determines that the target network service needs to be turned off based on the standard on-and-off state and the actual on-and-off state, sending, by the target server, a service turn-off request of the target network service to the control center, includes:
if the standard on-and-off state is an "off" state and the actual on-and-off state is an "on" state, sending out, by the target server, a state-error alarm, and/or sending, by the target server, a state-error notification to the control center.

6. The method according to claim 1, wherein if the control center determines that the target server is allowed to turn off the target network service, sending, by the control center, a service turn-off notification to the target server, and updating, by the control center, the standard on-and-off state of the target network service of the target server to an "off" state, includes:
after the target network service of the target server is turned off, if a turn-off ratio of target network services of all servers is smaller than a preset ratio threshold and a received number of service turn-off requests of the target network service sent by the target server is greater than a preset number threshold, allowing, by the control center, the target server to turn off the target network service, sending, by the control center, the service turn-off notification to the target server, and updating, by the control center, the standard on-and-off state of the target network service of the target server to the "off" state.

7. The method according to claim 6, wherein:
when there are multiple control centers, after one of the multiple control centers updates the standard on-and-off state, the other control centers are notified to carry out synchronous update.

8. The method according to claim 6, wherein:
when there are multiple control centers, after one of the multiple control centers receives a service turn-off request and before the control center increases a count value of requests, other control centers are notified in advance to synchronously increase a count value of requests with the one control center.

9. The method according to claim 1, wherein:
the target server is an edge server of a content delivery network (CDN) system, and the edge server is installed with an agent timer service;
the control center is installed with a network management platform and an http interface service; and
the edge server performs loop communication with the control center though the http interface service.

10. A system for managing network service, comprising:
a target server comprising a first processor, a first memory and a transceiver; and
a control center comprising a second processor and a second memory, wherein:
when executing computer programs stored in the first memory, the first processor is configured for, when in a self-controlled "ON" state, detecting an actual on-and-off state of a target network service every preset period of time and acquiring a standard on-and-off state of the target network service from the control center through the transceiver; if it is determined that that the target network service needs to be turned off based on the standard on-and-off state and the actual on-and-off state, sending a service turn-off request of the target network service to the control center through the transceiver; and after receiving a service turn-off notification from the control center through the transceiver, turning off the target network service; and
when executing computer programs stored in the second memory, the second processor is configured for, if it is determined that the target server is allowed to turn off the target network service, sending the service turn-off notification to the target server, and updating the standard on-and-off state of the target network service of the target server to an "off" state.

11. The system according to claim 10, wherein:
the first processor is further configured for sending the self-controlled "ON" request to the control center periodically through the transceiver;
the second processor is further configured for, if it is determined that a preset self-controlled state of the target server is an "on" state, sending a self-controlled "ON" notification to the target server; and
the first processor is further configured for, after receiving the self-controlled "ON" notification through the transceiver, entering the self-controlled "ON" state.

12. The system according to claim 10, wherein the first processor is further configured for:
if the standard on-and-off state and the actual on-and-off state are both "on" states, acquiring a preset on-and-off state of the target network service of the target server from the control center through the transceiver; and
if the preset on-and-off state is an "off" state, determining that the target network service needs to be turned off, and sending the service turn-off request of the target network service to the control center through the transceiver.

13. The system according to claim 10, wherein the first processor is further configured for:
if the standard on-and-off state is an "on" state and the actual on-and-off state is an "off" state, determining that the target network service needs to be turned off, and sending the service turn-off request of the target network service to the control center through the transceiver.

14. The system according to claim 10, wherein the first processor is configured for:
if the standard on-and-off state is an "off" state and the actual on-and-off state is an "on" state, sending out a state-error alarm and/or sending a state-error notification to the control center through the transceiver.

15. The system according to claim 10, wherein the second processor is configured for:
after the target network service of the target server is turned off, if a turn-off ratio of the target network service of all servers is smaller than a preset ratio threshold and the received number of service turn-off requests of the target network service sent by the target server is greater than a preset number threshold, allowing the target server to turn off the target network service, and sending the service turn-off notification to the target server, and further, updating the standard on-and-off state of the target network service of the target server to the "off" state.

16. The system according to claim 15, wherein:
when there are multiple control centers, after one of the multiple control centers updates the standard on-and-off state, the other control centers are notified to carry out synchronous update.

17. The system according to claim 15, wherein:
when there are multiple control centers, after one of the multiple control centers receives a service turn-off request and before the control center increases a count value of requests, other control centers are notified in advance to synchronously increase a count value of requests with the one control center.

18. The system according to claim 10, wherein:
the target server is an edge server of a content delivery network (CDN) system, and the edge server is installed with an agent timer service;
the control center is installed with a network management platform and an http interface service; and
the edge server performs loop communication with the control center though the http interface service.

* * * * *